US011697431B2

(12) United States Patent
Goto

(10) Patent No.: US 11,697,431 B2
(45) Date of Patent: Jul. 11, 2023

(54) AUTOMATED DRIVING ASSISTANCE APPARATUS

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 5 days.

(21) Appl. No.: 17/118,122

(22) Filed: Dec. 10, 2020

(65) Prior Publication Data

US 2021/0221399 A1 Jul. 22, 2021

(30) Foreign Application Priority Data

Jan. 17, 2020 (JP) ................................. 2020-005795
Sep. 4, 2020 (JP) ................................. 2020-148989

(51) Int. Cl.
*B60W 60/00* (2020.01)
*B60W 50/06* (2006.01)
*B60W 40/08* (2012.01)

(52) U.S. Cl.
CPC ........ *B60W 60/0013* (2020.02); *B60W 40/08* (2013.01); *B60W 50/06* (2013.01); *B60W 2540/22* (2013.01)

(58) Field of Classification Search
CPC .. B60W 60/0013; B60W 40/08; B60W 50/06; B60W 2540/22
See application file for complete search history.

(56) References Cited

U.S. PATENT DOCUMENTS

| | | | |
|---|---|---|---|
| 2017/0297587 A1* | 10/2017 | Mimura | B60W 30/18163 |
| 2017/0352267 A1* | 12/2017 | Tzirkel-Hancock | ......................... H04L 67/306 |
| 2018/0281811 A1 | 10/2018 | Tochioka et al. | |
| 2019/0049957 A1* | 2/2019 | Healey | A61B 5/0077 |
| 2020/0081611 A1* | 3/2020 | Beaurepaire | G06F 3/04847 |
| 2020/0218271 A1* | 7/2020 | Krystek | G06F 16/285 |
| 2020/0385025 A1* | 12/2020 | Nishimura | G06V 20/597 |
| 2021/0114619 A1* | 4/2021 | Mimura | B60W 60/0013 |

FOREIGN PATENT DOCUMENTS

| | | |
|---|---|---|
| JP | 2017-136922 A | 8/2017 |
| JP | 2018-169704 A | 11/2018 |

* cited by examiner

*Primary Examiner* — Yazan A Soofi
*Assistant Examiner* — Naeem Taslim Alam
(74) *Attorney, Agent, or Firm* — McDermott Will & Emery LLP

(57) ABSTRACT

An automated driving assistance apparatus includes an occupant's emotion learning section and a control parameter setting section. The occupant's emotion learning section creates an occupant's emotion model based on vehicle driving state information and occupant's emotion information. The occupant's emotion model is used to estimate an emotion of the occupant from a vehicle driving state. The control parameter setting section calculates an ideal driving state based on the occupant's emotion model, and set a control parameter for automated driving of the vehicle based on the ideal driving state. The control parameter setting section output input values relevant to the vehicle driving state to the occupant's emotion model, and select, from the input values received by the occupant's emotion model, an input value that causes a current occupant's emotion to become closer to a target emotion as the ideal driving state of the vehicle.

12 Claims, 5 Drawing Sheets

AUTOMATED DRIVING ASSISTANCE APPARATUS

CROSS-REFERENCE TO RELATED APPLICATIONS

The present application claims priority from Japanese Patent Application Nos. 2020-005795 filed on Jan. 17, 2020, and 2020-148989 filed on Sep. 4, 2020, the entire contents of each of which are hereby incorporated by reference.

BACKGROUND

The disclosure relates to an automated driving assistance apparatus.

A technique has been proposed that reflects driving properties of a driver, an occupant, or a passenger of a vehicle on traveling control of the vehicle to make the driver, the occupant, or the passenger less likely to have negative emotions such as anxiety or a sense of discomfort during the travel of the vehicle. For example, Japanese Unexamined Patent Application Publication (JP-A) No. 2018-169704 discloses a vehicle driving assistance system including: a personal server that learns a personal driver model inherent to a driver on the basis of driving data of the driver; and an in-vehicle controller disposed in the vehicle of the driver and conducting a predetermined vehicle control process. The personal server includes a recommend engine that instructs the in-vehicle controller to execute a recommended process. The recommend engine analyzes a current emotional state of the driver on the basis of data on the driver's voice contained in the driving data, and determines a recommended process appropriate for the analyzed emotional state on the basis of the personal driver model.

JP-A No. 2017-136922 discloses an electronic control apparatus that estimates an emotion of a driver or an occupant on the basis of biological information received from a biological sensor that measures biological information of the driver or the occupant, and controls traveling of the vehicle on the basis of the estimated emotion.

SUMMARY

An aspect of the technology provides an automated driving assistance apparatus including an occupant's emotion learning section and a control parameter setting section. The occupant's emotion learning section is configured to create an occupant's emotion model on the basis of driving state information of a vehicle and emotion information of an occupant of the vehicle. The occupant's emotion model is used to estimate an emotion of the occupant from a driving state of the vehicle. The control parameter setting section is configured to calculate, on the basis of the occupant's emotion model, an ideal driving state of the vehicle in which the emotion of the occupant becomes closer to a target emotion and set a control parameter for automated driving of the vehicle on the basis of the ideal driving state. The control parameter setting section is configured to output a plurality of input values relevant to the driving state of the vehicle to the occupant's emotion model, and select, from the plurality of input values received by the occupant's emotion model, an input value that causes a current emotion of the occupant to become closer to the target emotion as the ideal driving state of the vehicle.

An aspect of the technology provides an automated driving assistance apparatus including circuitry configured to create an occupant's emotion model on the basis of driving state information of a vehicle and emotion information of an occupant of the vehicle. The occupant's emotion model is used to estimate an emotion of the occupant from a driving state of the vehicle. The circuitry is configured to calculate, on the basis of the occupant's emotion model, an ideal driving state of the vehicle in which the emotion of the occupant becomes closer to a target emotion. The circuitry is configured to output a plurality of input values relevant to the driving state of the vehicle to the occupant's emotion model, and select, from the plurality of input values received by the occupant's emotion model, an input value that causes a current emotion of the occupant to become closer to the target emotion as the ideal driving state of the vehicle. The circuitry is configured to set a control parameter for automated driving of the vehicle on the basis of the ideal driving state.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

JP-A No. 2018-169704 discloses a recommend engine that derives an appropriate recommended process and outputs an appropriate recommend signal selected from among a vehicle-compartment-space recommend signal, a traveling route recommend signal, and an information presentation recommend signal depending on the situation. However, JP-A No. 2018-169704 fails to disclose a procedure for calculating specific control parameters. JP-A No. 2017-136922 also fails to disclose a procedure for calculating specific parameters to control the travel of a vehicle on the basis of an estimated emotion. Executing automated vehicle driving control necessitates sequential calculation of the control parameters. Therefore, it has been desired to provide a technique to sequentially calculate specific control parameters.

It is desirable to provide an automated driving assistance apparatus that makes it possible to sequentially calculate specific parameters for automated vehicle driving control that causes an emotion of a driver, an occupant, or a passenger to become closer to an ideal state.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Example Configuration of Automated Driving Assistance Apparatus

Figure 1:
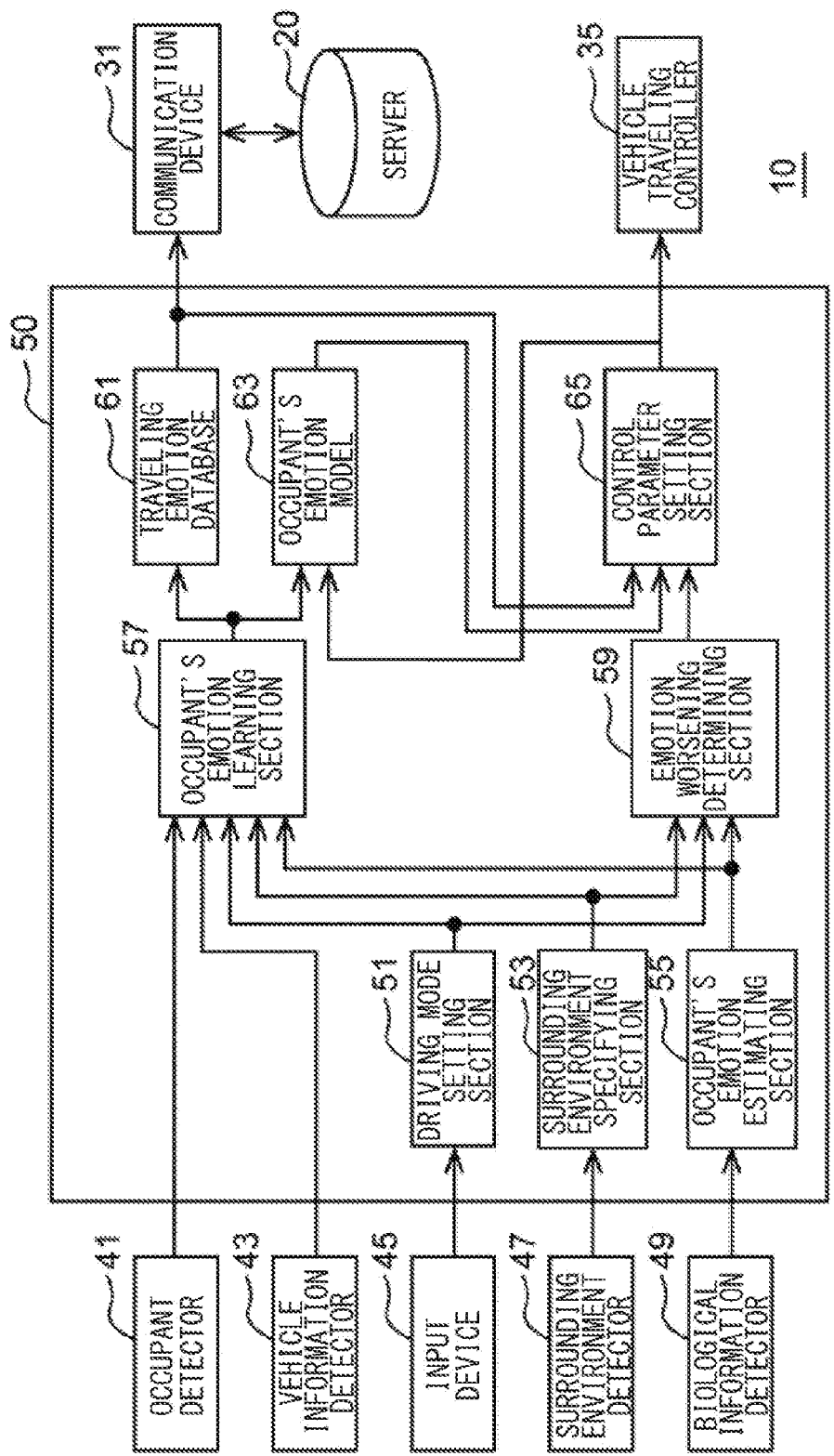
FIG. 1 is a block diagram illustrating an example configuration of an automated driving assistance apparatus according to one example embodiment of the technology.

Described first is an example configuration of an automated driving assistance apparatus according to an example embodiment of the technology. FIG. 1 is a block diagram illustrating an example configuration of an automated driving assistance apparatus 10 according to an example embodiment of the technology.

The automated driving assistance apparatus 10 may be mounted in a vehicle. The automated driving assistance apparatus 10 may detect an occupant in the vehicle and a driving state of the vehicle, and acquire information on a surrounding environment (hereinafter also referred to as surrounding environment information) of the vehicle. On the basis of the various pieces of information acquired, the automated driving assistance apparatus 10 may execute driving assistance control of the vehicle. The automated driving assistance apparatus 10 may include an occupant detector 41, a vehicle information detector 43, an input device 45, a surrounding environment detector 47, a biological information detector 49, an electronic controller 50, a communication device 31, and a vehicle traveling controller 35.

[1-1. Occupant Detector]

The occupant detector 41 may be disposed inside the vehicle to detect a driver, an occupant, and a passenger in the vehicle. The electronic controller 50 may receive the information acquired by the occupant detector 41. The occupant detector 41 may detect at least the presence of an occupant in the vehicle or identify each individual occupant in the vehicle. In this example embodiment, the occupant detector 41 may include a camera that captures an image of the interior of the vehicle compartment and an image processor that identifies each individual occupant on the basis of the image data acquired by the camera. The image processor may identify each individual person by calculating the feature quantity of a human face through image processing of the captured image data. Optionally, the occupant detector 41 may specify a position in which the detected occupant is seated. The electronic controller 50 may use the acquired occupant information to learn an emotion of each individual occupant.

[1-2. Vehicle Information Detector]

The vehicle information detector 43 may acquire information on a vehicle driving state. The vehicle driving state may include an operational state and a behavior of the vehicle. The electronic controller 50 may receive the information acquired by the vehicle information detector 43. The vehicle information detector 43 may acquire information on a behavior of the vehicle, such as a vehicle speed, an acceleration rate, or a yaw rate. For example, the vehicle information detector 43 may include one or more of an engine revolution sensor, a vehicle speed sensor, an acceleration sensor, and an angular speed sensor. The vehicle information detector 43 may further acquire information on an operational state of the vehicle, such as an acceleration operation amount, a brake operation amount, or a steering rudder angle. For example, the vehicle information detector 43 may include one or more of an accelerator position sensor, a brake stroke sensor, and a rudder angle sensor. The electronic controller 50 may use the acquired vehicle information to learn an emotion of each individual occupant.

[1.3. Input Device]

The input device 45 may receive input operations of a user, such as a driver, an occupant, or a passenger. In this example embodiment, the input device 45 may receive an input operation for switching a driving mode between a manual driving mode and an automated driving mode. While the driving mode is set to the automated driving mode, the input device 45 may receive an input operation to set a target emotion level of the occupant to be used to set a control parameter on the basis of an occupant's emotion model 63. As described in detail below, the occupant's emotion may be divided into nine levels in total in this example embodiment: four-level positive emotions, four-level negative emotions, and a neutral emotion defined between the positive emotions and the negative emotions. The driver or occupant may set any one of the nine emotion levels as the target emotion level.

The input device 45 should not be limited to a particular device. The input device 45 may be a touch panel, a dial switch, a button switch, or another appropriate input device. Alternatively, the input device 45 may be a device that receives an input in the form of a voice or gesture.

[1-4. Surrounding Environment Detector]

The surrounding environment detector 47 may acquire the surrounding environment information of the vehicle. The electronic controller 50 may receive the information acquired by the surrounding environment detector 47. The surrounding environment detector 47 may detect a person, another vehicle, a bicycle, a building, and other obstacles present around the vehicle, to acquire the surrounding environment information of the vehicle. The surrounding environment detector 47 may further detect a weather condition, a road condition, a sunshine condition, or other conditions in a position or area in which the vehicle is traveling. For example, the surrounding environment detector 47 may include one or more of the following devices: a camera that captures an image of the surrounding environment of the vehicle, a radar that detects an object present around the vehicle, and a detector, such as a LiDAR, that detects a distance or azimuth to an object present around the vehicle. The surrounding environment detector 47 may further include a communication device that acquires information from a device outside the vehicle via a vehicle-to-vehicle communication or a road-to-vehicle communication, for example. The surrounding environment detector 47 may further include a detector that acquires information relevant to road surface friction. The electronic controller 50 may specify the surrounding environment on the basis of the surrounding environment information acquired.

[1-5. Biological Information Detector]

The biological information detector 49 may include one or more detectors that acquire information to be used to estimate an emotion or sensitivity of the occupant. The electronic controller 50 may receive the information acquired by the biological information detector 49. Alternatively, the camera and the image processor in the occupant detector 41 may serve as the biological information detector 49. In such a case, the image processor may acquire biological information, such as the heart rate, pulse rate, or temperature, of the occupant on the basis of a change in color of an image of the occupant's face captured by the camera, for example. Additionally, the biological information detector 49 may include one or more of the following devices: a Doppler sensor detecting the heart rate of the occupant using an electromagnetic wave, a non-contact pulse sensor detecting the pulse rate of the occupant, an electrode embedded in the steering wheel to measure the heart rate or electrocardiogram of the driver, a pressure instrument embedded in the driver's seat to measure the sitting pressure distribution while the occupant is seated on the seat, a device detecting a change in the position of the seatbelt to measure the heart rate or breathing of the occupant, a time of flight (TOF) sensor acquiring information on the position (biological position) of the occupant, and a thermographic device measuring the skin surface temperature of the occupant. The occupant detector 41 may further include a mountable detector such as a wearable device acquiring the biological information of the occupant while being mounted on the occupant.

[1-6. Communication Device]

The communication device 31 may be an interface to exchange information between the electronic controller 50 and an external server 20. For example, the communication device 31 may be a communication interface accessible to the external server 20 via a mobile communication network. The communication device 31 may communicate with the external server 20 to share a traveling emotion database 61 accumulated in one vehicle among a plurality of vehicles. The communication device 31 may be omitted in a case where the traveling emotion database 61 is not shared.

[1-7. Vehicle Traveling Controller]

The vehicle traveling controller 35 may control the travel of the vehicle. The vehicle traveling controller 35 may include one or more control sections that control the travel of the vehicle. For example, the vehicle traveling controller 35 may include a control section that controls driving of an engine, a power transmission mechanism including one or more drive motors and a transmission, a steering system, and a brake system. In this example embodiment, the vehicle traveling controller 35 may control automated driving of the vehicle. When the driving mode is set to the automated driving mode, the vehicle traveling controller 35 may automatically control at least a part of the travel of the vehicle regardless of driver's operations, causing the vehicle to travel toward a destination along a set traveling route.

While the vehicle is traveling in the automated driving mode, the vehicle traveling controller 35 may control the travel of the vehicle in response to a command from the electronic controller 50. For example, the vehicle traveling controller 35 may control the automated driving of the vehicle using control parameters received from the electronic controller 50.

[1-8. Electronic Controller]

The electronic controller 50 may include an arithmetic processing unit, such as a central processing unit (CPU) or a micro-processing unit (MPU), and a memory, such as a random access memory (RAM) or a read only memory (ROM), for example. The arithmetic processing unit may execute programs stored in the memory to conduct various kinds of calculation processes. In addition to or in place of the memory, the electronic controller 50 may include a storage medium, such as a hard disk drive (HDD), a compact disc (CD), a digital versatile disc (DVD), a solid state drive (SSD), a universal serial bus (USB) flash drive, or a storage device. Note that a portion or the entirety of the electronic controller 50 may be an updatable software such as a firmware, or a program module to be executed in response to a command from the CPU, for example.

The electronic controller 50 may be coupled to the occupant detector 41, the vehicle information detector 43, the input device 45, the surrounding environment detector 47, the biological information detector 49, and the vehicle traveling controller 35 in a direct manner or in an indirect manner via a controller area network (CAN) or a local interconnect network (LIN), for example.

In this example embodiment, the electronic controller 50 may include a driving mode setting section 51, a surrounding environment specifying section 53, an occupant's emotion estimating section 55, an occupant's emotion learning section 57, an emotion worsening determining section 59, the traveling emotion database 61, the occupant's emotion model 63, and a control parameter setting section 65. Among these sections, the driving mode setting section 51, the surrounding environment specifying section 53, the occupant's emotion estimating section 55, the occupant's emotion learning section 57, the emotion worsening determining section 59, and the control parameter setting section 65 may be implemented by programs executed by the arithmetic processing unit. Additionally, the traveling emotion database 61 and the occupant's emotion model 63 may be data stored in the storage.

[1-8-1. Driving Mode Setting Section]

The driving mode setting section 51 may switch the driving mode of the vehicle between the manual driving mode and the automated driving mode on the basis of an operation input signal received from the input device 45. Optionally, the driving mode setting section 51 may set a level of the automated driving mode. While the vehicle is traveling in the manual driving mode, the electronic controller 50 in the automated driving assistance apparatus 10 according to the example embodiment creates the occupant's emotion model 63 by learning an occupant's emotion. In contrast, while the vehicle is traveling in the automated driving mode, the electronic controller 50 estimates an occupant's emotion using the occupant's emotion model 63, calculates an ideal driving state of the vehicle that causes a current occupant's emotion to become closer to a target emotion level, and sets, on the basis of the ideal driving state, a control parameter for the automated driving control.

[1-8-2. Surrounding Environment Specifying Section]

The surrounding environment specifying section 53 may specify the surrounding environment of the vehicle on the basis of the surrounding environment information received from the surrounding environment detector 47. For example, the surrounding environment specifying section 53 may specify: the position of an own vehicle on a map; the positions or dimensions of other vehicles including an oncoming vehicle, a bicycle, a pedestrian, a building, and another obstacle; a distance between these obstacles and the own vehicle; and a relative speed between the obstacles and the own vehicle. The surrounding environment specifying section 53 may specify the surrounding environment at a predetermined time interval depending on the throughput of the electronic controller 50.

[1-8-3. Occupant's Emotion Estimating Section]

The occupant's emotion estimating section 55 may estimate an occupant's emotion on the basis of the biological information received from the biological information detector 49. For example, the occupant's emotion estimating section 55 may receive various pieces of the biological information including the heart rate and brain waves from the biological information detector 49, and convert each piece of the biological information into an index of a predetermined emotion, such as "scary" or "comfortable". For example, the occupant's emotion estimating section 55 may map each piece of the biological information on a two-dimensional coordinate of each predetermined emotion. Each emotion may be divided into two categories: a positive emotion and a negative emotion. The positive emotion and the negative emotion may each be divided into multiple levels. In this example embodiment, the positive emotion and the negative emotion may each be divided into four levels, and a neutral level may be defined between the four positive levels and the four negative levels. That is, each emotion may be divided into nine levels in total in this example embodiment.

Note that the term "positive" used herein may refer to a good emotional state in which the occupant feels safe or comfortable, and the term "negative" used herein may refer to a bad emotional state in which the occupant feels unsafe or uncomfortable.

[1-8-4. Occupant's Emotion Learning Section]

The occupant's emotion learning section 57 learns the occupant's emotion model 63 while the driving mode is set to the manual driving mode. The occupant's emotion learning section 57 creates the occupant's emotion model 63 on the basis of the information on the occupant's emotion estimated by the occupant's emotion estimating section 55, the information on the vehicle driving state detected by the vehicle information detector 43, and the information on the surrounding environment of the vehicle specified by the surrounding environment specifying section 53. For example, the occupant's emotion learning section 57 may accumulate, in the traveling emotion database 61, a data set including the information on the occupant's emotion, the information on the vehicle driving state temporally connected to the information of the occupant's emotion, and the information on the surrounding environment of the vehicle temporally connected to the information of the occupant's emotion, and create the occupant's emotion model 63 using the data set.

Figure 2:
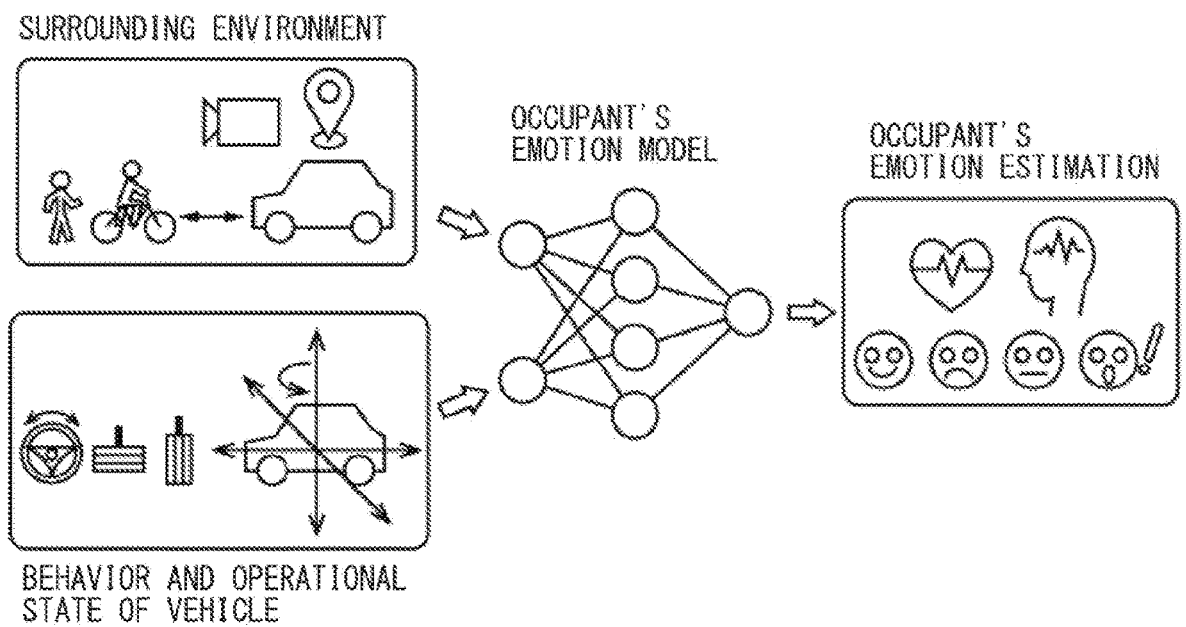
FIG. 2 is an explanatory diagram illustrating an example of an occupant's emotion model according to one example embodiment of the technology.

FIG. 2 illustrates an example of the occupant's emotion model 63. The occupant's emotion model 63 may be a learning model that receives, as input data, the information on the vehicle driving state and the information on the surrounding environment, that outputs an estimated occupant's emotion. The data set used to create the occupant's emotion model 63 may be a time-series data set. Thus, the occupant's emotions may be estimated in a sequential manner by outputting, to the occupant's emotion model 63, the time-series data set including the information on the vehicle driving state and the information on the surrounding environment of the vehicle as the input data.

For example, the information on the vehicle driving state serving as the input data may include time-series data on acceleration rates of the vehicle in frontward, rearward, rightward, leftward, upward, and downward directions, a yaw angle, a pitch angular speed, a roll angular speed, a vehicle speed, a steering angle, an accelerator operation amount, and a brake operation amount. The information on the vehicle driving state may further include information on the engine revolution number, an output of a turn signal lamp, the number of occupants, and an attribution of each occupant, for example. The surrounding environment information of the vehicle serving as the input data may include data on: the lane on which the own vehicle is traveling; the attribution, relative distance, relative speed, and advancing direction of a traffic participant such as another vehicle or a pedestrian; and traffic rules or regulations including the number of lanes, traffic light information, and a speed limit of the road on which the own vehicle is traveling. The surrounding environment information of the vehicle may further include information on the weather, the state of a road, and the attribution of a building, for example.

The occupant's emotion model 63 may receive a plurality of inputs the number of which corresponds to the number of the pieces of the input data. In that case, the time order of the time-series data described above may be maintained. Alternatively, the occupant's emotion model 63 may define time windows in the time-series data, retrieve a feature quantity, such as a maximum value, a minimum value, or an average value of each time window, from the time-series data, and receive the feature quantities as the input data. In that case, the number of pieces of the input data may be proportional to the number of the feature quantities retrieved from the time-series data. Further, the occupant's emotion model 63 may output a single estimated value of the occupant's emotion.

It should be noted that the method of creating the occupant's emotion model 63 shall not be limited to a particular method. For example, a known method, such as a method using a support vector machine, a neighborhood method, a method using a neutral network such as deep learning, or a Bayesian network, may be employed as appropriate.

[1-8-5. Emotion Worsening Determining Section]

The emotion worsening determining section 59 may determine whether the occupant's emotion is worsening while the driving mode is set to the automated driving mode. In this example embodiment, the emotion worsening determining section 59 may determine whether the emotion level estimated by the occupant's emotion estimating section 55 is a more negative level than the target emotion level set via the input device 45.

[1-8-6. Control Parameter Setting Section]

While the driving mode is set to the automated driving mode, the control parameter setting section 65 sets control parameters to be used by the vehicle traveling controller 35 to control the automated driving. The control parameter setting section 65 calculates, on the basis of the occupant's emotion model 63, the ideal driving state that causes the occupant's emotion to become closer to the target emotion level, and sets, on the basis of the ideal driving state, a control parameter for the automated driving control. In this example embodiment, the control parameter setting section 65 outputs a plurality of input values relevant to the vehicle driving state, such as a vehicle speed, an acceleration or deceleration rate, or a rudder angle, to the occupant's emotion model 63. From the input values received by the occupant's emotion model 63, the control parameter setting section 65 selects, as the ideal driving state of the vehicle, an input value that causes a current occupant's emotion to become closer to the target emotion level, and set the control parameter on the basis of the ideal driving state of the vehicle.

The control parameter may be a variable to be used to calculate the control amount of each object to be controlled in the automated driving control of the vehicle by the vehicle traveling controller 35. For example, the control parameter may include a vehicle speed, an acceleration or deceleration rate, a steering rate, or other values.

The target emotion level may be set via the input device 45, for example. The occupant including the driver may perform an input operation to set the target emotion level in advance using the input device 45. Alternatively, the control parameter setting section 65 may always set, as the target emotion level, an emotion level more positive by one or more levels than the emotion level estimated by the occupant's emotion estimating section 55. Still alternatively, the control parameter setting section 65 may always set the most positive emotion level as the target emotion level. Yet alternatively, the control parameter setting section 65 may set the neutral emotion level as the target emotion level when the occupant's emotion level estimated by the occupant's emotion estimating section 55 is on the negative side.

In a case where the occupant's emotion estimated by the occupant's emotion estimating section 55 is on the negative side while the vehicle is traveling under a predetermined circumstance, the control parameter setting section 65 may inquire about the target emotion level of the occupant under a similar circumstance, and set the target emotion level on the basis of an occupant's response. For example, in a case where the occupant's emotion estimated by the occupant's emotion estimating section 55 on the basis of the occupant's biological information has changed to be more negative when the own vehicle is turning right in spite of the presence of an oncoming vehicle traveling near the own vehicle than the occupant's emotion before the own vehicle turns right, the control parameter setting section 65 may inquire about the target emotion level in a similar circumstance. The content of the inquiry may be set in advance, and may be reproduced via an in-vehicle speaker when the occupant's emotion has changed to be more negative.

For example, the control parameter setting section 65 may ask the occupant "Do you prefer driving less scary in this circumstance?" or "Do you prefer driving focused on timings even if you feel a little insecure?". If the occupant gives a positive response to the inquiry "Do you prefer driving less scary in this circumstance?", the control parameter setting section 65 may set the neutral level as the target emotion level. If the occupant gives a positive response to the inquiry "Do you prefer driving focused on timings even if you feel a little insecure?", the control parameter setting section 65 may set, as the target emotion level, an emotion level higher by one or more levels than the currently estimated emotion level.

Further, the control parameter setting section 65 prepares a plurality of potential input values to be outputted to the occupant's emotion model 63, and sequentially output the plurality of input values to the occupant's emotion model 63. From these input values, the control parameter setting section 65 selects an input value corresponding to the emotion level closest to the target emotion level out of the emotion levels outputted from the occupant's emotion model 63. Considering the selected input value to be the ideal driving state, the control parameter setting section 65 sets the control parameter on the basis of the selected input value. This allows the automated driving of the vehicle to be controlled so as to cause the occupant's emotion to become closer to the target emotion level. If there are a plurality of input values corresponding to the emotion level closest to the target emotion level, the control parameter setting section 65 may select one of the input values closest to the current control parameter.

Figure 3:
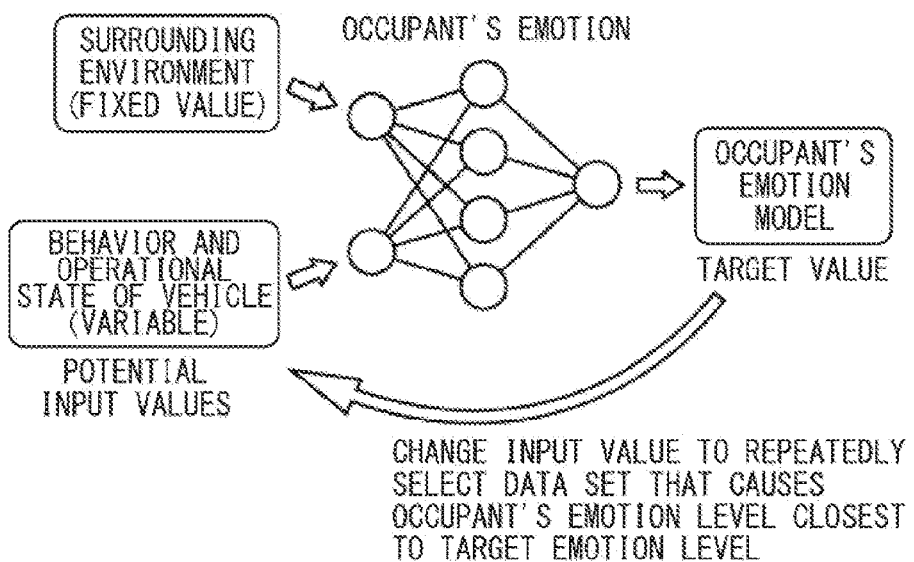
FIG. 3 is an explanatory diagram illustrating an algorithm of setting a control parameter for a vehicle using the occupant's emotion model.

FIG. 3 illustrates an example algorithm of setting the control parameter for the vehicle using the occupant's emotion model 63. The input value used to calculate the control parameter may be an input value relevant to the operational state and the behavior of the vehicle traveling under the automated driving control. The input value relevant to the surrounding environment may be information uncontrollable (i.e., a fixed value). Thus, the surrounding environment information (fixed value) acquired by the surrounding environment detector 47 may be used as the input value relevant to the surrounding environment.

The number of the potential input values to be prepared may be appropriately determined on the basis of at least one of the throughput of the arithmetic processing unit in the electronic controller 50 or the frequency of update of the control parameter. For example, the number of the potential input values to be prepared may be determined in advance as follows. First, the number of times of calculation processing in which the input values are received by the occupant's emotion model 63 and the occupant's emotion is outputted may be calculated per unit time from the amount of data necessary to create the occupant's emotion model 63 and the processing capacity of the arithmetic processing unit that performs the calculation processing using the occupant's emotion model 63. Second, on the basis of the calculated number of times of the calculation processing and the calculated rate of updating the control parameter, the number of times of the calculation processing to be performed may be calculated each time the control parameter is updated. The number of times of the calculation processing may be set as the number of the potential input values. To accurately execute the automated driving control, the number of times of the calculation processing may be set to a maximum possible value in consideration of the throughput of the arithmetic processing unit and the frequency of update of the control parameter.

The control parameter setting section 65 sequentially outputs the input values to the occupant's emotion model 63 to determine emotion levels corresponding to the respective input values, and selects an input value corresponding to the emotion level closest to the target emotion level. Considering the selected input value to be the ideal driving state, the control parameter setting section 65 sets the control parameter on the basis of the selected input value. For example, the control parameter setting section 65 may retrieve, from the data sets stored in the traveling emotion database 61, a data set of the vehicle driving state that is identical or similar to the surrounding environment information currently acquired by the surrounding environment detector 47 and that corresponds to the occupant's emotion closest to the target emotion level set in advance. The control parameter setting section 65 may set that the retrieved data set of the vehicle driving state as a reference operation target value.

The control parameter setting section 65 may prepare the plurality of potential input values in terms of the information on the vehicle driving state, such as a rudder angle or an acceleration rate. The number of the potential input values may correspond to the number of times of the calculation processing described above. The potential input values may be defined between a current value and the reference operation target value. For example, in the case of vehicle speed data indicating that the current vehicle speed is 40 km/h, the reference operation target value is 30 km/h, and the number of times of the calculation processing is three, the potential input values of the vehicle speed may be 30 km/h, 35 km/h, and 40 km/h. The control parameter setting section 65 may process all of the other data in a similar way to prepare a plurality of potential input values. One reason why the plurality of input values is prepared is as follows: if the surrounding environment information of the data set determined to be the reference operation target value is not completely identical to the current surrounding environment, the reference operation target value does not necessarily correspond to the vehicle driving state that causes the occupant's emotion to become closer to the target emotion level.

The control parameter setting section 65 sequentially outputs the prepared input values to the occupant's emotion model 63 and selects a data set of the vehicle driving state corresponding to the occupant's emotion closest to the target emotion level out of the occupant's emotions outputted. On the basis of the data set selected, the control parameter setting section 65 may set the control parameter in terms of a vehicle speed, an acceleration or deceleration rate, or a steering rate, to control the automated driving. As described above, the number of the potential input values may be determined on the basis of at least one of the throughput of the arithmetic processing unit or the frequency of update of the control parameter. This allows the control parameter setting section 65 to successively update the control parameter in each cycle of the processing executed by the arithmetic processing unit. The control parameter setting section 65 may set the control parameter using the occupant's emotion model 63 in each cycle of the processing executed by the arithmetic processing unit, and send the information on the set control parameter to the vehicle traveling controller 35. Accordingly, it is possible to sequentially calculate the control parameters for the automated driving control that causes the occupant's emotion to become closer to the target emotion level. This allows for the automated driving control that makes the occupant to feel comfortable.

2. Example Operations

Figure 4:
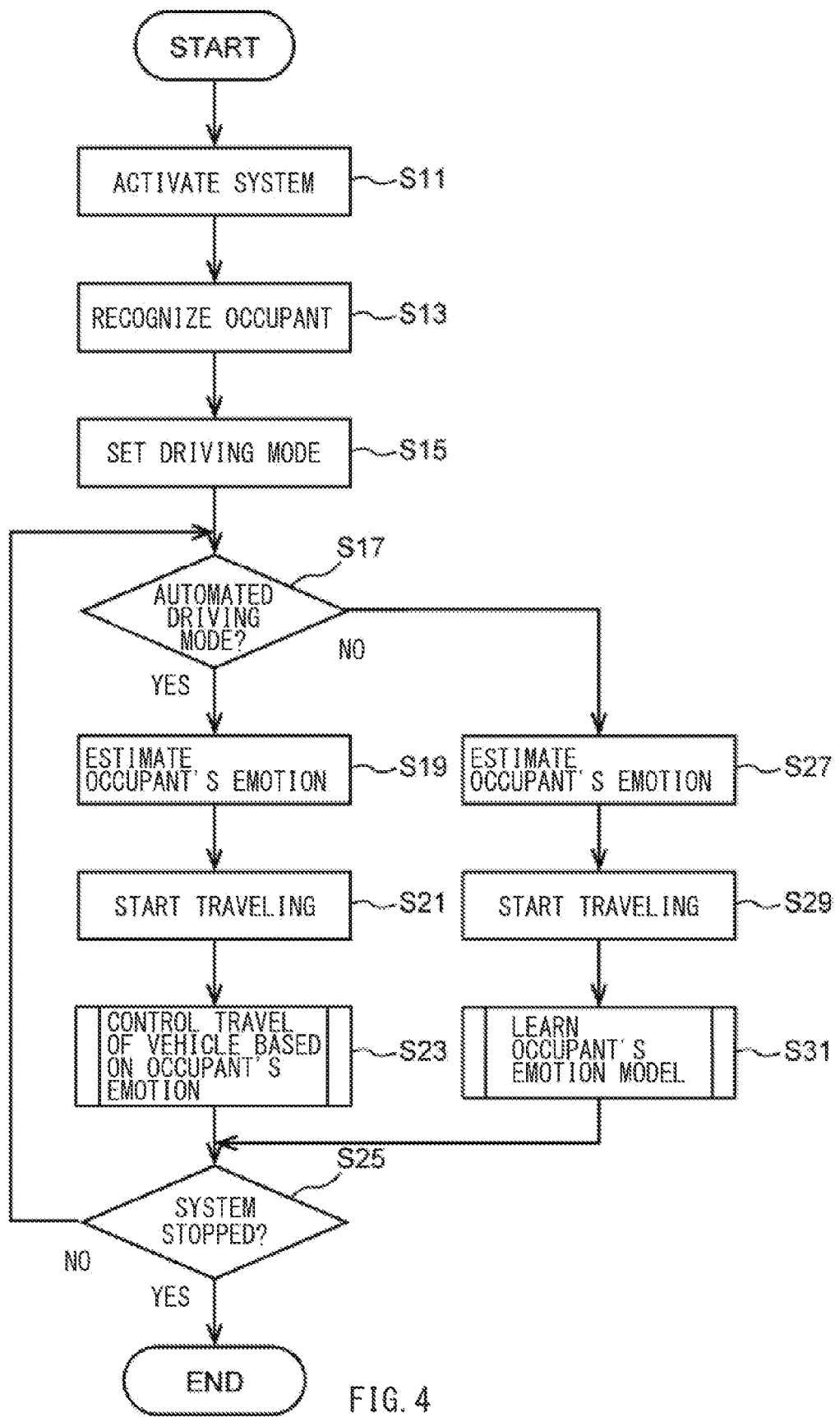
FIG. 4 is a flowchart of an example operation of the automated driving assistance apparatus according to one example embodiment of the technology.

The example configuration of the automated driving assistance apparatus 10 according to the example embodiment is described above. In the following description, an example operation of the automated driving assistance apparatus 10 is described with reference to flowcharts illustrated in FIGS. 4 to 6. Hereinafter, descriptions about some of the contents explained in the example configuration above are omitted.

First, when the electronic controller 50 of the automated driving assistance apparatus 10 detects activation of the system (Step S11), the occupant detector 41 may recognize an occupant in the vehicle (Step S13). Thereafter, the driving mode setting section 51 may set the driving mode of the vehicle to the manual driving mode or the automated driving mode on the basis of the driving mode received via the input device 45 (Step S15).

Next, the driving mode setting section 51 may determine whether the driving mode is the automated driving mode (Step S17). If the driving mode is not the automated driving mode, i.e., if the driving mode is set to the manual driving mode (Step S17: NO), the occupant's emotion estimating section 55 may estimate an occupant's emotion on the basis of the biological information received from the biological information detector 49 (Step S27). In the example embodiment, the occupant's emotion estimated by the occupant's emotion estimating section 55 may belong to any of the plurality of emotion levels defined as described above. The occupant's emotion estimated at this time may be stored as information on the occupant's emotion at the start of traveling. Thereafter, the vehicle traveling controller 35 may start controlling the travel of the vehicle in accordance with a driving operation by the driver, causing the vehicle to start traveling (Step S29). After the vehicle is caused to start traveling in the manual driving mode, the electronic controller 50 may cause the occupant's emotion learning section 57 to learn the occupant's emotion model 63 (Step S31). While the vehicle is traveling in the manual driving mode, the electronic controller 50 may repeat the process of learning the occupant's emotion model 63 until the system is stopped (i.e., until it is determined as "YES" in Step S25).

Figure 5:
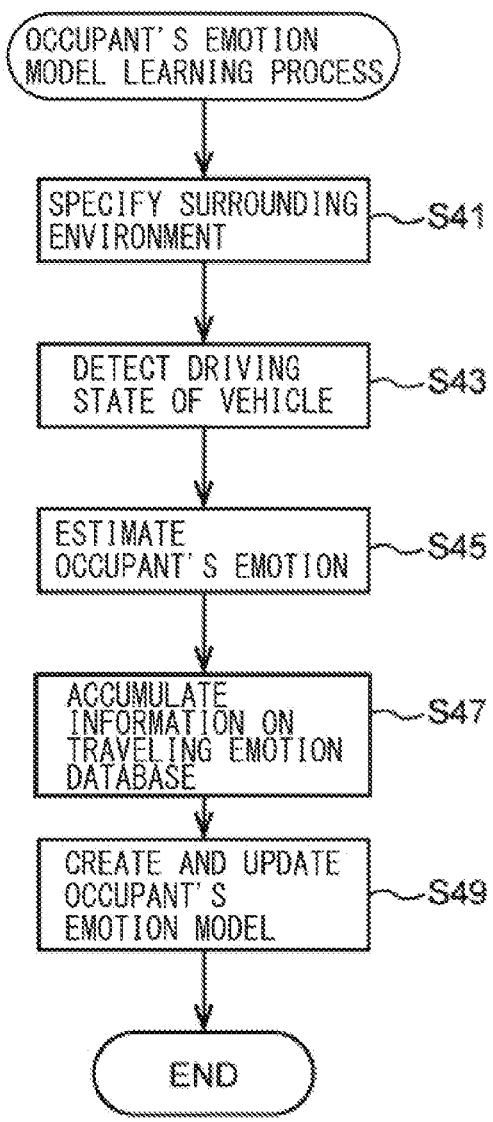
FIG. 5 is a flowchart of an example process executed by the automated driving assistance apparatus according to one example embodiment of the technology to learn the occupant's emotion model.

FIG. 5 is a flowchart of an example process executed by the automated driving assistance apparatus 10 to learn the occupant's emotion model. First, the surrounding environment specifying section 53 may specify information on a current surrounding environment of the vehicle on the basis of the surrounding environment information received from the surrounding environment detector 47 (Step S41). Next, the vehicle information detector 43 may detect a current driving state of the vehicle (Step S43). Thereafter, the occupant's emotion estimating section 55 may estimate an occupant's emotion on the basis of the biological information received from the biological information detector 49 (Step S45).

Thereafter, the occupant's emotion learning section 57 may acquire the information on the occupant's emotion, the information on the surrounding environment, and the information on the vehicle driving state, and accumulate the information on the occupant's emotion, and the information on the surrounding environment and the information on the vehicle driving state that are temporally connected to the information on the occupant's emotion in the traveling emotion database 61 (Step S47). Thereafter, the occupant's emotion learning section 57 may create or update the occupant's emotion model 63 on the basis of the information on the occupant's emotion, the information on the surrounding environment temporally connected to the information on the occupant's emotion, and the information on the vehicle driving state temporally connected to the information on the occupant's emotion through a known method such as deep learning (Step S49). The occupant's emotion learning section 57 may repeat Steps S41 to S49 in each cycle of the processing executed by the arithmetic processing unit to create the occupant's emotion model 63.

In contrast, if the driving mode is the automated driving mode (Step S17: YES), the occupant's emotion estimating section 55 may estimate an occupant's emotion on the basis of the biological information received from the biological information detector 49 (Step S19). The occupant's emotion estimated at this time may be stored as information on the occupant's emotion at the start of traveling. Thereafter, the vehicle traveling controller 35 may start controlling the travel of the vehicle in the automated driving mode to cause the vehicle to start traveling (Step S21). After the vehicle is caused to start traveling in the automated driving mode, the electronic controller 50 may control the travel of the vehicle based on the occupant's emotion (Step S23). While the vehicle is traveling in the automated driving mode, the electronic controller 50 may keep controlling the travel of the vehicle on the basis of the occupant's emotion until the system is stopped (i.e., it is determined as "YES" in Step S25).

Figure 6:
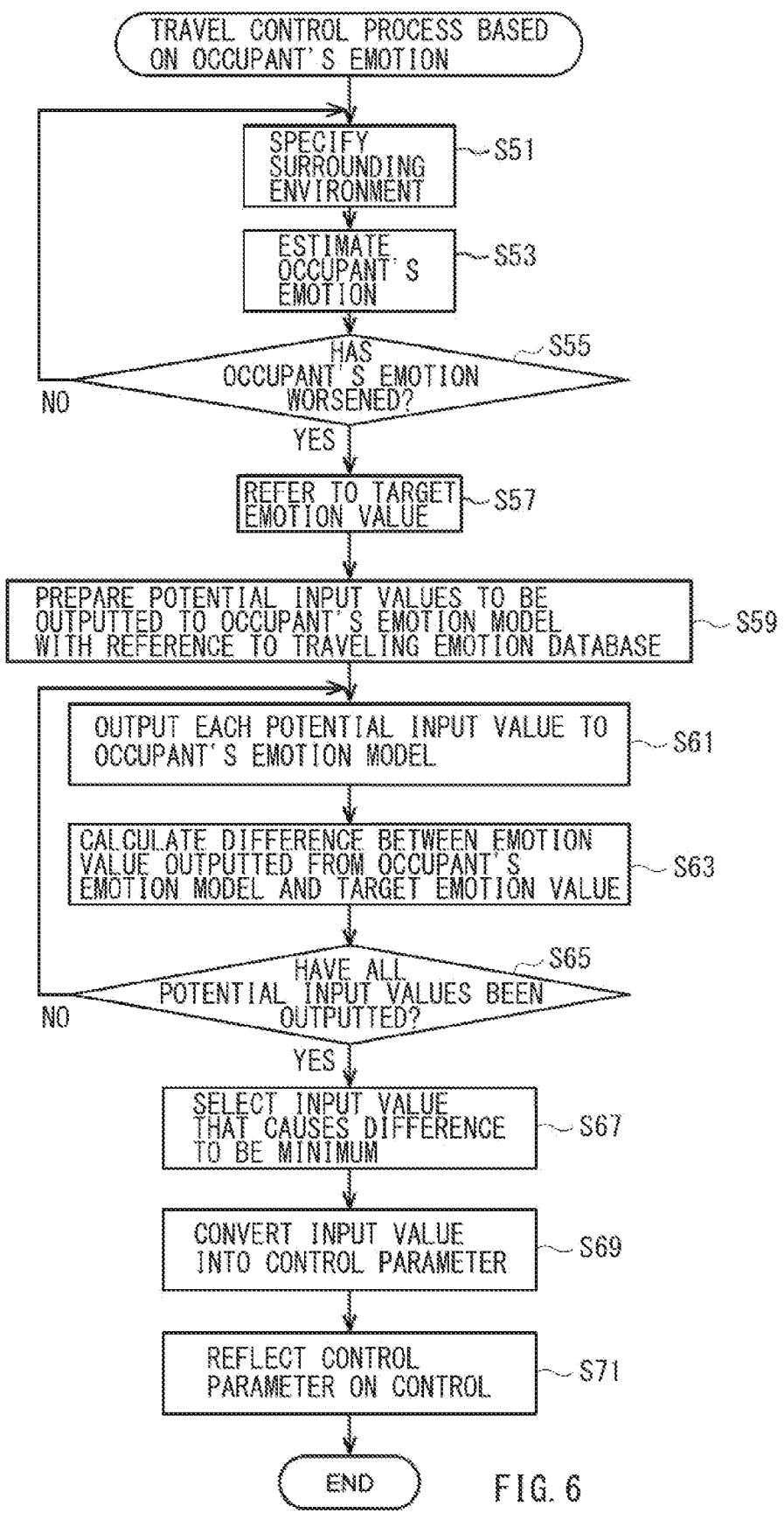
FIG. 6 is a flowchart of an example process executed by the automated driving assistance apparatus according to one example embodiment of the technology to control the travel of a vehicle on the basis of an occupant's emotion.

FIG. 6 is a flowchart of an example process executed by the automated driving assistance apparatus 10 to control the travel of the vehicle on the basis of the occupant's emotion. First, the surrounding environment specifying section 53 may specify information on a current surrounding environment of the vehicle on the basis of the surrounding environment information received from the surrounding environment detector 47 (Step S51). Next, the occupant's emotion estimating section 55 may estimate an occupant's emotion on the basis of the biological information received from the biological information detector 49 (Step S53). Thereafter, the emotion worsening determining section 59 may determine whether the estimated occupant's emotion has worsened (Step S55). In this example embodiment, the emotion worsening determining section 59 may determine whether the level of the estimated occupant's emotion has changed to a more negative level than before.

If the occupant's emotion has not worsened (Step S55: NO), the automated driving assistance apparatus 10 may cause the process to return to Step S51, and repeat Steps S51 to S55. In contrast, if the occupant's emotion has worsened (Step S55: YES), the control parameter setting section 65 may refer to the target emotion value set in advance (Step S57). In this example embodiment, the control parameter setting section 65 may refer to the information on the target emotion level set in advance.

Thereafter, the control parameter setting section 65 may prepare the potential input values to be outputted to the occupant's emotion model 63 with reference to the traveling emotion database 61 (Step S59). For example, referring to the traveling emotion database 61, the control parameter setting section 65 may retrieve a data set of the vehicle driving state corresponding to the occupant's emotion closest to the target emotion level from the data set of the surrounding environment that is identical or similar to the current surrounding environment. Thereafter, the control parameter setting section 65 may set the retrieved data set of the vehicle driving state as the reference operation target value. The control parameter setting section 65 may prepare the potential input values that are defined between the value of the current driving state of the vehicle and the reference operation target value. The number of the potential input values to be prepared may correspond to a predetermined number of times of the calculation processing.

Thereafter, the control parameter setting section 65 may output each of the potential input values to the occupant's emotion model 63 and acquire the information on the occupant's emotion outputted from the occupant's emotion model 63 (Step S61). The control parameter setting section 65 may then calculate a difference between the value of the occupant's emotion outputted from the occupant's emotion model 63 and the target emotion value (Step S63). In this example embodiment, the control parameter setting section 65 may calculate a difference between the level of the occupant's emotion outputted from the occupant's emotion model 63 and the target emotion level. Thereafter, the control parameter setting section 65 may determine whether all of the potential input values have been outputted to the occupant's emotion model 63 (Step S65). If some of the potential input values have not been outputted to the occupant's emotion model 63 (Step S65: NO), the control parameter setting section 65 may cause the process to return to Step S61 and output the next potential input value to the occupant's emotion model 63. The control parameter setting section 65 may repeat Steps S61 to S65 until all of the potential input values have been outputted to the occupant's emotion model 63.

If all of the potential input values have been outputted to the occupant's emotion model 63 (Step S65: YES), the control parameter setting section 65 may select the input value that causes the difference between the level of the emotion outputted from the occupant's emotion model 63 and the target emotion level to be minimum (Step S67). The input value to be selected at this time may be an input value that causes the occupant's emotion level to be closest to the target emotion level. Thereafter, the control parameter setting section 65 may convert the selected input value into a control parameter for the automated driving control (Step S69). The control parameter setting section 65 may then output the calculated control parameter to the vehicle traveling controller 35 to reflect the calculated control parameter on the automated driving control (Step S71).

In both cases where the travel of the vehicle is controlled on the basis of the occupant's emotion while the vehicle is traveling in the automated driving mode (Step S23) and where the process of learning the occupant's emotion model 63 is performed while the vehicle is traveling in the manual driving mode (Step S31), the automated driving assistance apparatus 10 may determine whether the system has been stopped (Step S25). If the system has not been stopped (Step S25: NO), the automated driving assistance apparatus 10 may repeat Steps S17 to S31 described above. In contrast, if the system has been stopped (Step S25: YES), the automated driving assistance apparatus 10 may end the control process.

As described above, the automated driving assistance apparatus 10 according to the example embodiment may accumulate, in the traveling emotion database 61, the information on the occupant's emotion, the information on the vehicle driving state temporally connected to the information on the occupant's emotion, and the information on the surrounding environment temporally connected to the information on the occupant's emotion while the driving mode is set to the manual driving mode. Additionally, the automated driving assistance apparatus 10 creates the occupant's emotion model 63 using the information. Further, the automated driving assistance apparatus 10 prepares potential input values of the vehicle driving state to be outputted to the occupant's emotion model 63 with reference to the traveling emotion database 61 while the driving mode is set to the automated driving mode, and sets the control parameter for the automated driving control on the basis of the input value that causes the level of the emotion outputted from the occupant's emotion model 63 to be closest to the target emotion level.

The traveling emotion database 61 may include the set of pieces of data temporally connected with each other, and the control parameter setting section 65 sets the control parameter on the basis of any of the potential input values of the vehicle driving state that causes the occupant's emotion level to become closest to the target emotion level. Accordingly, it is possible to sequentially calculate and set specific control parameters that cause the occupant's emotion to become closer to the target emotion level. Therefore, it is possible to achieve the automated driving control that makes it possible to cause an occupant's emotion to become closer to an ideal state.

Further, the control parameter setting section 65 may select, from the traveling emotion database 61, the data set of the surrounding environment identical or similar to the current surrounding environment of the vehicle, and set the control parameter using the selected data set. Accordingly, it is possible to achieve traveling control that causes the occupant's emotion to become closer to the target emotion level even if the data set of the surrounding environment identical to the current surrounding environment is not stored in the traveling emotion database 61.

3. Modification Example

The automated driving assistance apparatus 10 according to the foregoing example embodiment may be modified in various ways. Now, some modification examples are described in which the control parameter setting section 65 sets the control parameter in conformance with an individual occupant.

In a first modification example, the occupant may determine in advance the values of one or more data items of each of the input values to be outputted to the occupant's emotion model 63. For example, in a case where an occupant gives priority to the vehicle-speed in the automated driving control, the occupant may set the vehicle speed as an item of high priority in advance. When preparing the potential input values, the control parameter setting section 65 may fix the data on vehicle speed to a vehicle speed of the reference operation target value retrieved from the traveling emotion database 61, and prepare the potential input values for the other data items. Accordingly, it is possible to set the control parameter that causes an occupant's emotion to become closer to the ideal emotion while reflecting occupant's preferences on the vehicle driving state.

In a second modification example, the control parameter setting section 65 may retrieve, from the traveling emotion database 61, a data item of the vehicle driving state that gives a significant impact on the emotion of each individual occupant. The control parameter setting section 65 may fix the data item retrieved for the corresponding occupant, and prepare the potential input values for the other data items. For example, the occupant detector 41 may identify each individual occupant and prepare the traveling emotion database 61 containing data sets for respective individual occupants. Thereafter, the occupant's emotion learning section 57 may analyze the sensitivity of the data sets to the occupant's emotion model 63 to retrieve a data item that gives a significant impact on the occupant's emotion. For example, the sensitivity analysis may employ a method of specifying a data item that significantly changes the emotion level to be outputted when being deleted from the data items to be outputted or when the numerical value of the data item is changed. The control parameter setting section 65 may fix the input value of the specified data item to the reference operation target value retrieved from the traveling emotion database 61, and prepare the potential input values for the other data items. Accordingly, it is possible to set the control parameter that causes an occupant's emotion to become closer to the ideal emotion while preferentially setting the input value of the data item that gives a significant impact on the emotion of each individual occupant.

In a case where the level of the occupant's emotion estimated on the basis of the biological information acquired by the biological information detector 49 during the execution of the automated driving control based on the control parameter calculated through the method according to the first modification example is more negative than the emotion level calculated using the occupant's emotion model 63, the occupant may be proposed to set, as the item of high priority, the data item specified as giving a significant impact on the occupant's emotion by the method according to the second modification example.

According to these modification examples, at least one of an occupant's preference or an objective tendency based on the accumulated traveling emotion database 61 may be reflected on the automated driving control based on the occupant's emotion model 63. This allows for the automated driving control on which an intention or characteristic of an individual occupant is reflected.

In the above description, some example embodiments and modification examples of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, the technology should not be limited to the foregoing example embodiments in which the occupant's emotion learning section 57 accumulates the data sets in the traveling emotion database 61 to update the occupant's emotion model 63 while the driving mode is set to the manual driving mode. Alternatively, the occupant's emotion learning section 57 may accumulate the data sets in the traveling emotion database 61 to update the occupant's emotion model 63 even while the driving mode is set to the automated driving mode.

One or more of the occupant's emotion learning section 57 and the control parameter setting section 65 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the occupant's emotion learning section 57 and the control parameter setting section 65. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the occupant's emotion learning section 57 and the control parameter setting section 65 illustrated in FIG. 1.

The invention claimed is:

1. An automated driving assistance apparatus comprising:
   an occupant's emotion learning section configured to, during a manual driving mode,
      collect data sets each including driving state information of a vehicle, surrounding environment information of the vehicle, and emotion information of an occupant of the vehicle associated with each other, and
      train an occupant's emotion model on a basis of the data sets, the occupant's emotion model being used to estimate an emotion of the occupant from a driving state of the vehicle;
   a control parameter setting section configured to: during an automated driving mode,
      select one of the data sets based on a current surrounding environment and a target emotion, the selected one of the data sets including emotion information closest to the target emotion,
      generate values based on (1) driving state information from the selected one of the data sets and (2) current driving state information of the vehicle;

estimate emotions of the occupant corresponding to the values, respectively, using the occupant's emotion model;

determine one of the estimated emotions of the occupant that is closest to the target emotion among the estimated emotions;

select one of the values that corresponds to the determined one of the estimated emotions of the occupant; and convert the selected one of the values to a control parameter for automated driving control of the vehicle; and a vehicle controller configured to control automated driving of the vehicle using the control parameter.

2. The automated driving assistance apparatus according to claim 1, wherein the driving state information from the selected one of the data sets includes a first data item having a first value, the control parameter setting section is configured to obtain the current driving state information of the vehicle, the current driving state information including a second data item having a second value, the second data item being of a same type as the first data item, and the control parameter setting section is configured to define the values in accordance with the first value of the first data item and the second value of the second data item.

3. The automated driving assistance apparatus according to claim 2, wherein driving state information of the vehicle in each data set of the data sets includes a third data item having a third value and a fourth data item, different from the third data item, having a fourth value, one of the third and fourth data items is given a priority, and when the third data item has the priority, the control parameter setting section is configured to:

set the third value of the third data item to one of the values for the occupant's emotion model, and prepare another of the values based on the fourth data item.

4. The automated driving assistance apparatus according to claim 3, wherein, the control parameter setting section is configured to receive information indicating that the emotion of the occupant becomes lower, and when (1) the control parameter obtained based on the third value of the third data item with the priority is used to perform the automated driving control of the vehicle, and as a result, the information indicates that the emotion of the occupant becomes lower than before, and (2) it is determined that the fourth data item gives a significant impact on the emotion of the occupant, the control parameter setting section is configured to propose giving a priority to the fourth data item.

5. The automated driving assistance apparatus according to claim 1, wherein driving state information of the vehicle in each data set of the data sets includes a first data item having a first value and a second data item, different from the first data item, having a second value, the control parameter setting section is configured to retrieve, from one of the data sets, driving state information in the one of the data sets including the first data item that gives a significant impact on the emotion of the occupant, and the control parameter setting section is configured to set the first value of the first data item to one of the values for the occupant's emotion model.

6. The automated driving assistance apparatus according to claim 1, wherein the control parameter setting section is configured to determine a number of sets of the values for the occupant's emotion model on a basis of at least one of a throughput of an arithmetic processing unit that performs a calculation or a frequency of update of the control parameter.

7. The automated driving assistance apparatus according to claim 2, wherein the control parameter setting section is configured to determine a number of sets of the values for the occupant's emotion model on a basis of at least one of a throughput of an arithmetic processing unit that performs a calculation or a frequency of update of the control parameter.

8. The automated driving assistance apparatus according to claim 3, wherein the control parameter setting section is configured to determine a number of sets of the values for the occupant's emotion model on a basis of at least one of a throughput of an arithmetic processing unit that performs a calculation or a frequency of update of the control parameter.

9. The automated driving assistance apparatus according to claim 4, wherein the control parameter setting section is configured to determine a number of sets of the values for the occupant's emotion model on a basis of at least one of a throughput of an arithmetic processing unit that performs a calculation or a frequency of update of the control parameter.

10. The automated driving assistance apparatus according to claim 5, wherein the control parameter setting section is configured to determine a number of sets of the values for the occupant's emotion model on a basis of at least one of a throughput of an arithmetic processing unit that performs a calculation or a frequency of update of the control parameter.

11. An automated driving assistance apparatus comprising circuitry, wherein, during a manual driving mode, the circuitry is configured to:

collect, during a manual driving mode, data sets each including driving state information of a vehicle, surrounding environment information of the vehicle, and emotion of an occupant of the vehicle associated with each other, and train an occupant's emotion model on a basis of the data sets, the occupant's emotion model being used to estimate an emotion of the occupant from a driving state of the vehicle, and wherein, during an automated driving mode, the circuitry is further configured to:

select one of the data sets based on a current surrounding environment and a target emotion, the selected one of the data sets including emotion information closest to the target emotion, generate values based on (1) a driving state information from the selected one of the data sets and (2) a current driving state information of the vehicle;

estimate emotions of the occupant corresponding to the values, respectively, using the occupant's emotion model;

determine one of the estimated emotions of the occupant that is closest to the target emotion among the estimated emotions;

select one of the values that corresponds to the determined one of the estimated emotions of the occupant;

convert the selected one of the values to a control parameter for automated driving control of the vehicle; and control automated driving of the vehicle using the control parameter.

12. An automated driving assistance apparatus for a vehicle, the automated driving assistance apparatus comprising:

a memory; and a controller coupled with the memory, wherein the controller is configured to store, in the memory, during a manual driving mode:

data sets, wherein each data set associates a respective first value and a respective second value with a respective third value, wherein each first value, according to a vehicle driving state, includes at least one of a speed, an acceleration or deceleration, and a rudder angle of the vehicle output from sensors, wherein each second value, according to a surrounding environment of the vehicle, includes at least relative distance to obstacles present around the vehicle, and wherein each third value, according to an occupant emotion, is specified from predetermined values according to outputs from the sensors; and emotional model data including rules and parameters, wherein the parameters are adjusted so that each third value is obtained from a respective result calculated using the associated first and second values according to the rules, wherein the controller is configured to control the vehicle regardless of a driver's operations, causing the vehicle to travel toward a destination along a set traveling route, and wherein the controller is configured to, during an automated driving mode:

select one of the data sets based on a current surrounding environment and a target emotion, the selected one of the data sets including a respective third value that is closest to the target emotion;

generate values based on (1) the first value from the selected one of the data sets and (2) a value corresponding to a current vehicle driving state;

estimate emotions of an occupant corresponding to the values, respectively, using the emotion model data;

determine one of the estimated emotions of the occupant that is closest to the target emotion among the estimated emotions;

select one of the values that corresponds to the determined one of the estimated emotions of the occupant;

convert the selected one of the values to a control parameter for automated driving control of the vehicle; and control automated driving of the vehicle using the control parameter.

* * * * *